United States Patent Office 3,205,209
Patented Sept. 7, 1965

3,205,209
PROCESS FOR THE POLYMERIZATION OF ETHYL-
ENICALLY UNSATURATED COMPOUND IN
THE PRESENCE OF A PENTAHYDROCARBON
AMMONIUM COMPOUND AND A HEAVY MET-
AL COMPOUND
Russell W. Perry, Somerset, Mass., assignor to The Fire-
stone Tire & Rubber Company, Akron, Ohio, a corpo-
ration of Ohio
No Drawing. Filed Oct. 18, 1961, Ser. No. 145,991
16 Claims. (Cl. 260—93.7)

This application is a continuation-in-part of my co-
pending application Serial No. 104,228, filed April 20,
1961, and now abandoned.

This invention relates to the polymerization of ethylen-
ically unsaturated compounds and to novel catalysts
therefor.

In recent years relatively low pressure catalytic polym-
erization processes have been devised for producing high
polymers of ethylenically unsaturated compounds, and
particularly of the lower alphaolefins and conjugated di-
olefins. Catalysts for these processes have comprised var-
ious activated metallic oxides or have required an organ-
ometallic compound or alkali metal as a component.
Many of the polymers of these processes have exhibited
stereospecific properties, such as crystallinity. Catalysts
satisfactory for polymerization of conjugated diolefins
have rarely been useful for polymerizing simple olefins,
such as propylene, to crystalline polymers.

It is an object of this invention to provide a novel cata-
lytic process for polymerizing ethylenically unsaturated
compounds to useful polymers. Another object is to pro-
vide a novel catalytic polymerization process operable at
low or moderate pressures and temperatures in inexpen-
sive apparatus. A further object is to provide a novel
method of making crystalline polypropylene. Another
object is to provide a novel method of making resinous
polymers of vinyl and vinylidene monomers. A further
object is to provide a novel method of making highly lin-
ear, rubbery polymers of butadiene and isoprene. An-
other object is to provide a polymerization process capa-
ble of stereospecific effects not achieved in the prior art.
A further object is to provide novel catalyst compositions
for use in the above and other processes. Other objects
of the invention will be readily apparent in the descrip-
tion of the invention which follows.

SYNOPSIS OF THE INVENTION

The above and other objects of the invention are at-
tained by the discovery of a novel class of polymerization
catalysts comprising (A) a pentahydrocarbon compound
of nitrogen and (B) a compound of a heavy metal, boron,
silicon, arsenic or tellurium. By the use of the novel cat-
alysts ethylenically unsaturated compounds can be polym-
erized at moderate pressures and temperatures to high
polymers of regular stucture, the actual structure in a par-
ticular case being predetermined by the exact reagents
used within the fields pointed out above, their ratio, the
specific unsaturated compound or compounds being po-
lymerized, and the polymerization conditions. In certain
preferred areas of the invention the polymers produced
are crystalline and high-melting. The classification of ele-
ments referred to above and in succeeding portions of this
specification and appended claims is to be taken on the
basis of the Periodic Chart of the Elements on pages 54
and 55 of Lange's Handbook of Chemistry, 5th ed., Hand-
book Publishers, Inc., 1944.

THE ETHYLENICALLY UNSATURATED COMPOUNDS

The polymerization method of the invention is applica-
ble to the polymerization of any of the ethylenically un-
saturated monomers commonly polymerized, and it is es-
pecially applicable to the polymerization of alpha-olefins,
which are generally less readily polymerizable than the
more polar ethylenically unsaturated monomers. The po-
lymerization of propylene by the method of the invention
is especially advantageous, since the polymerization prod-
uct under preferred conditions possesses a high degree of
crystallinity. Other monoolefins suitable for polymeriza-
tion by the method of the invention include, for example,
ethylene, butene-1, isobutylene, pentene-1, hexene-1, oc-
tene-1, 2-methylbutene-1, 2-methylpentene-1, 3-methyl-
pentene-1, 3-ethylpentene-1, cyclopentene, cyclohexene,
styrene, alpha-methylstyrene, chlorostyrene, divinylben-
zene, vinylnaphthalene, and the like. Also amenable to
the process of the invention are polyolefinic compounds
particularly conjugated diolefins including, without lim-
itation, butadiene-1,3, chloroprene, isoprene, 2,3-dimeth-
ylbutadiene-1,3, piperylene, 1-cyanobutadiene, 2-phenyl-
butadiene, cyclopentadiene, 2-methoxybutadiene, 1,4-pen-
tadiene, 1,4,7-octatriene, and the like. Likewise, the in-
vention can be used to polymerize vinyl and vinylidene
monomers including, without limitation, vinyl chloride,
vinylidene chloride, vinylidene fluoride, chlorotrifluoro-
ethylene, vinyl pyrrolidone, the lower alkyl acrylates, the
lower alkyl methacrylates, the lower alkyl ethacrylates,
vinyl acetate, vinyl ethers, vinyl propionate, acrylonitrile,
cinnamic acid esters, methacrylonitrile, vinylpyridines,
vinyl cyanide, vinylcarbazole, and the like. The inven-
tion can be used to make copolymers or interpolymers of
any of the monomers indicated above. Likewise the in-
vention can be utilized to polymerize a prepolymer or par-
tially polymerized compound, with itself or with another
ethylenically unsaturated compound.

(A) THE PENTAHYDROCARBON COMPOUNDS

The pentahydrocarbon compounds of nitrogen em-
ployed in this invention are compounds analogous to or-
gano-alkali compounds and have the empirical formula.

(I)   $R^1R^2R^3R^4R^5N$ wherein $R^1$, $R^2$, $R^3$, $R^4$ and $R^5$ may be the same or differ-
ent and are hydrocarbon groups individually containing
from 1 to 30 carbon atoms, with the proviso that any
pair of $R^1$, $R^2$, etc. may together constitute a single hy-
drocarbon radical which is twice bonded to the nitrogen.
Preferably at least one of the groups is an aryl or aralkyl
group.

$R^1$, $R^2$, $R^3$, $R^4$ and $R^5$ as above described include both
hydrocarbon and substituted hydrocarbon radicals se-
lected from the group of radicals consisting of normal
or branched chain alkyl, aryl, cycloalkyl, alkaryl, aralkyl,
alkoxyalkyl, aroxyalkyl, halogenated alkyl, halogenated aryl, (particularly fluorinated alkyl and fluorinated aryl). Aryl includes naphthyl, biphenyl, etc. In any event, the individual hydrocarbon group should not contain more than 30 carbon atoms and preferably at least one of the groups is an aryl or aralkyl group. These compounds in general are synthesized by the reaction of an organometallic compound, particularly an alkali metal hydrocarbon compound such as a sodium hydrocarbon with a quaternary salt, particularly a quaternary halide, according to the reaction (using the notation above)

(1) 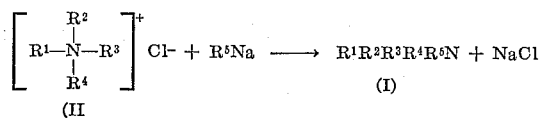

It is generally considered that the compounds (I) have the structural formula (I-A) 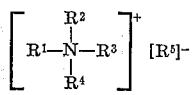

with the proviso that the localization of the $R^1$, $R^2$, $R^3$, $R^4$ and $R^5$ groups is open to question, as rearrangement, exchange, and tautomerism very likely occur during or after the synthesis. Compounds of this sort are discussed in Gilman: "Organic Chemistry, An Advanced Treatise," 2nd edition, vol. I, John Wiley and Sons, Inc. (1943), page 529, last two lines, and page 530, lines 1–15. Preparations of this type of compound are also shown in Ber. 49, 603 (1916); Ber. 50, 274 (1917); Ber. 54, 2615; Angew. Chemie 63, 15 (1951), and Ann. 557, 201 (1947). Suitable compounds are exemplified in benzyl tetramethyl ammonium, triphenylmethyl tetramethyl ammonium, 9-fluorenyl tetramethyl ammonium, benzyl tetrabutyl ammonium, benzyl orthoxylylene dimethyl ammonium, dibenzyl trimethyl ammonium, benzyl phenyl trimethyl ammonium, triphenylmethyl benzyl trimethyl ammonium, triphenylmethyl phenyl trimethyl ammonium, dibenzyl dimethyl tallow ammonium, benzyl tallow trimethyl ammonium, triphenylmethyl tallow trimethyl ammonium, 9-fluorenyl phenyl trimethyl ammonium, etc. By the term "tallow" it is intended to designate the mixed alkyl radicals present in the alcohols derived by the reduction of the fatty acids produced by hydrolysis of tallow. It will be understood that mixtures of compounds of the types above indicated as being suitable may be used instead of the pure compounds.

In some cases, syntheses according to reaction (1) above yield intermediate compounds which are unstable and reject a hydrocarbon, according to the reaction (2) 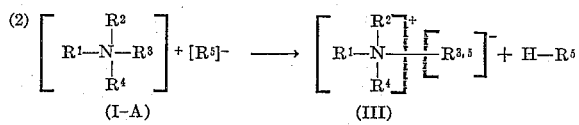

It is believed that nitrogen forms either a pentahydrocarbon compound, that is, compounds having the general formula of (I-A), or will form an ylide having the formula shown in (III). This is at variance with the behavior of the heavier members of group (V-A) which are believed to react further to form an ylene structure (which nitrogen does not) to the almost complete exclusion of the ylide or pentahydrocarbon structure, thus (3) 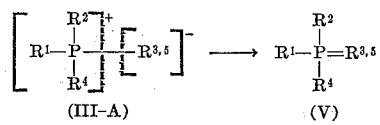

In reactions (2) and (3) $R^{3,5}$ is the residue of the radical $R^3$ after a hydrogen has been abstracted to form the hydrocarbon (IV). Compounds of the type (III) and (III-A) are called "ylides," and compounds of Formula V are called "ylenes." It will be seen that the compounds (III) fall within the general class of compounds I-A discussed above, since the radical $R^{3,5}$ serves the function of both radicals $R^3$ and $R^5$ of Formula I-A and is twice bonded to the nucleus associated with the nitrogen, once covalently and once electrically, in accordance with the proviso mentioned in discussing Formula I above. Examples of such ylide compounds are those having the formulas $(CH_3)_3N^+-CH_2^-$, $(CH_3)_2(C_2H_5)N^+-CH_2^-$, and the like. To sum up, the contrast between nitrogen on the one hand, and phosphorus and heavier group V-A elements on the other hand is that whereas phosphorus and the heavier group V-A elements form a covalent double bond with the twice-bonded radical $R^{3,5}$ under these circumstances, nitrogen appears only to form a single covalent bond and anionic bond so that the radical $R^{3,5}$ is linked to the nitrogen by both covalent and ionic bonding. See Eastman Kodak Company, "Organic Chemical Bulletin," vol. 32 (1960), No. 2, for a discussion of these compounds.

(B) THE HEAVY METAL COMPOUNDS

The heavy metal compounds forming the other components of the catalysts of this invention are those of the heavy metals, (i.e., those metals embraced by the heavy black lines within the brackets entitled "Heavy Metals," including the lanthanides or rare earth elements Nos. 57–71 in the Periodic Table on pages 54 and 55 of the Lange Handbook cited above), or of boron, silicon, arsenic or tellurium. In general the compounds used will be oxides of these metals or salts thereof such as the fluorides, chlorides, bromides, iodides, cyclopentadienyl compounds, acetylacetonates, alkoxides, acetates, or the like, it being understood that the salts need not be simple salts but may be the oxy-salts or salts containing different anions. Particularly preferred are the compounds of the transition metals, that is, the compounds of the metals of Groups IV-B and V-B of the Periodic Table cited supra. It is further preferred to use such compounds in a lower valence state, i.e., in a valence below the highest normal valence of the metal. Such reduced valence compounds are desirably formed by reducing a higher valence compound of the IV-B or V-B metal by contact with a metal above the IV-B or V-B metal in the electromotive series or other powerful reducing agent under conditions so as to provide a finely dispersed catalyst. Specific suitable heavy metal compounds for use in this invention include for instance titanium tetrachloride, zirconium tetrachloride, zirconium acetylacetonate, titanium tetrabutoxide, vanadium oxytrichloride, ferric chloride, ferrous chloride, titanium trichloride, antimony pentachloride, bismuth trichloride, titanium dichloride, stannic chloride, colbaltous chloride, antimonyl chloride, tungsten pentachloride, chromium chloride, nickel chloride and the like. Particularly satisfactory results are secured with certain "activated" aluminum-titanium-chlorine-containing preparations produced by heating metallic aluminum with titanium tetrachloride at moderately elevated temperatures on the order of 90° C. in approximately the mol ratio of 3 mols of titanium tetrachloride to 1 gram-atom of aluminum metal. The reaction product has the empirical formula $Ti_3AlCl_{12}$, and appears to be a true compound of all of these elements, since any excess of titanium tetrachloride may be leached therefrom down to, but not beyond, the composition of the formula given. The simple reaction product prepared as just described should preferably be subjected to an "activated" process, after which it is known as an "activated" preparation and is suitable for use in this invention. The intermediate simple reaction product is subjected to intensive grinding as in a ball mill, edge runner, roll mill, disc mill, impact mill or the like. In general the extent of the grinding should be such that the power consumed in the process will amount to about 3–100 kilowatt hour per gram of material. The function of this grinding is not alone to reduce the particle size, but seems also to develop certain hyperactive, strained, crystal defect areas in the material, as the crystalline X-ray diffraction pattern changes progressively during the grinding. It will be understood that mixtures of heavy metal compounds above indicated as suitable may also be employed. It will be understood that mixtures of compounds above indicated as suitable may also be used.

THE PREPARATION OF THE CATALYSTS AND CONDUCT OF THE POLYMERIZATION REACTION

The catalysts of this invention are prepared by mixing and agitating the selected pentahydrocarbon compound and heavy metal compound together, preferably in a saturated aliphatic or aromatic liquid hydrocarbon vehicle such as petroleum ether, heptane, kerosene, mineral oil, diesel oil, benzene, toluene or the like. Usually the pentahydrocarbon compound will be insoluble in the medium, and in many cases the heavy metal compound will also be insoluble. It may be advisable, in order to promote the reaction with the solids, to subject the catalyst mass to grinding, as in a ball mill. Temperature of mixing may vary within wide limits, usually between $-10°$ C. or lower, say down to $-100°$ C. up to temperatures on the order of $150°$ C. Preferably the temperature will be in the range $20°$ C.–$100°$ C. As to the relative proportions of the ingredients, usually a sufficient quantity of the pentahydrocarbon compound will be used so as to supply at least about 0.2 mol of nitrogen for each mol of the heavy metal compound. The upper limit is not critical, and is set mainly by economic considerations of cost of supplying unnecessary pentahydrocarbon compound. Similarly the lower limit is set mainly by economic considerations of cost of supplying unnecessary heavy metal compound. It will usually be desirable to operate in the range of 1.0 to 3.0 mols of nitrogen (in the pentahydrocarbon compound) per mol of heavy metal compound. Additives such as hexamethyl phosphoramide may be incorporated in the catalysts, and will enhance the yield of crystalline polymers in the products, if this is desired. A preferred class of polymerization modifiers are the alkylamino compounds of silicon and titanium and particularly the tetrakis (dimethylamino) silane, hexakis (dimethylamino) siloxane, etc. as described by Alfred R. Cain in U.S. application S.N. 126,788. The catalyst may either be prepared in a separate vessel, or may be prepared in the vessel in which the polymerization proper is to take place, and in this latter case may optionally be prepared in the presence of the monomers to be polymerized. The polymerization is carried out by contacting the monomers with the catalyst, preferably in a saturated liquid hydrocarbon vehicle such as suggested above, preferably with sufficient agitation to insure contact of the catalyst and monomers and to avoid segregation of the product. The amount of vehicle employed should be preferably sufficient to avoid difficulty in agitation during the reaction, i.e., so that the concentration of the final polymer-product will not be over 50%, based on the total weight of polymer plus vehicle. The amount of catalyst should be such that it will reach economic exhaustion at about the same time that the vehicle contains all of the polymer it can carry without difficulty in agitation. Ordinarily it will be expected that each gram of catalyst will produce from 15 to 100 grams of polymer. The polymerization may be carried out batchwise, or in a continuous manner wherein the catalyst (or ingredients thereof), vehicle and monomer are continuously supplied to a reactor system and the resultant polymer solution or dispersion is continuously discharged from the reactor system. The polymeric products are purified by any suitable treatment, as by washing with alcohols, acids, ammonia and the like. The portions of the catalyst residues derived from the pentahydrocarbon compounds are readily removable from the polymer, and in any event are innocuous.

With the foregoing general discussion in mind, there are given herewith detailed examples of the practice of this invention. All parts and percentages are given on the basis of weight, unless the contrary is specifically indicated.

Example 1

| | |
|---|---|
| Heptane | 250 ml. |
| Propylene | 25 grams. |
| Sodium phenyl suspension (1 molar, in mineral oil) | 1.0 or 2.0 ml. (.001 or .002 mol, per Table I). |
| Tetramethyl ammonium chloride suspensions (1 molar, in mineral oil) | 1.0 ml. (.001 mol). |
| Aluminum - titanium - chlorine preparation suspension (produced by reduction of $TiCl_4$ with metallic aluminum followed by intensive grinding; "ARA" produced by Stauffer Chemical Company, 1 molar, in suspension in mineral oil) | 3.0 or 2.0 ml. (.003 or .002 mol, per Table I). |
| Hexamethyl phosphoramide suspension (1 molar, in mineral oil) | 0.0 or 1.0 ml. (per Table I). |

A series of runs was made in accordance with the foregoing recipe, varying the ingredients from run to run as set forth hereinafter in Table I. In each run the heptane was charged into a 28-ounce beverage bottle, which was then flushed with nitrogen and sealed with a neoprene-lined crown cap provided with a perforation for the hypodermic injection of reactants. The bottle was then inverted and placed in a cradle on a balance which was first brought to equilibrium and then overweighted with a 25-gram weight. Propylene was injected through a conduit and hypodermic needle until the balance was in equilibrium. The back pressure at this point was about 40 p.s.i.g. The suspensions of tetramethyl ammonium chloride, hexamethyl phosphoramide, titanium-aluminum-chlorine preparation and sodium phenyl, in the amounts indicated for the run, were then hypodermically injected and the bottle was placed on a polymerizer wheel which revolved and dipped the bottle in a water bath at $50°$ C. for 64 hours. It is believed that the sodium phenyl reacts with the tetramethyl ammonium chloride to form benzene and an "ylide" having the formula

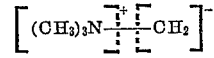

At the end of this time the bottle was removed from the wheel, cooled to $25°$ C., vented and opened, and the polymer separated from the liquid vehicle by decantation. The solid product was then reslurried in heptane, the slurry poured into methanol and the mixture agitated for 15 minutes. The slurry mixture was then filtered, and the solid resinous product removed from the filter and dried in open air for 24 hours. The yield of solid, highly isotactic resinous product for each run is set forth in Table I.

The liquid decanted from the polymerizer mixture and the filtrate from the reslurrying operation (a two-phase system) was diluted with ethanol and then heated to drive off the volatile material, leaving an atactic rubbery polymer. The yield of this rubbery polymer is also set forth in each run in the accompanying Table I.

tion suspension was injected and the bottle revolved on the polymerizer wheel at 50° C. for an additional 24 hours. At the end of this time the bottle was removed from the wheel, and the contents worked up as described in Example I. The product obtained comprised 10.8 grams of highly isotactic resinous polymer and 20.2 grams of atactic rubbery polymer. The rubbery polymer probably contained a proportion of the mineral oil injected with the catalyst ingredient, which accounts for the excess thereof over the theoretically possible yield.

TABLE I

| Catalyst ingredients (millimols) | | | | Yield (grams) | | Run No. |
|---|---|---|---|---|---|---|
| Na phenyl | (CH$_3$)$_4$NCl | Ti$_3$AlCl$_{12}$* | Phosphoramide | Isotactic | Atactic | |
| 2.0 | 1.0 | 3.0 | --------- | 2.7 | 5.8 | 1 |
| 1.0 | 1.0 | 2.0 | 1.0 | 2.7 | 3.0 | 2 |

*In this and in the following tables, the empirical formula "Ti$_3$AlCl$_{12}$" is used to designate the aluminum-titanium-chlorine preparation.

Similarly, using the same conditions butene-1, 4-methylpentene-1, 3-methylbutene-1, and 3,3-dimethylbutene-1 are each polymerized to a highly isotactic polymer. The use of a modifier such as tetrakis(dimethylamino)silane increases the isotactic content of the polymers.

*Example II*

| | |
|---|---|
| Heptane | 250 ml. |
| Propylene | 25 grams. |
| Sodium benzyl suspension (1 molar, in mineral oil) | 3.0 ml. (.003 mol). |
| Tetramethyl ammonium chloride suspension (1 molar, in mineral oil) | 3.0 ml. (.003 mol). |
| Titanium-aluminum-chlorine preparation suspension (produced by reduction of TiCl$_4$ with metallic aluminum followed by intensive grinding; "ARA" produced by Stauffer Chemical Company, 1 molar suspension, in mineral oil) | 2 ml. (.002 mol). |

The heptane and propylene were charged into a polymerization bottle as described in Example I. The sodium benzyl and tetramethyl ammonium chloride suspensions were then hypodermically injected into the bottle, which was then placed on a polymerizer wheel at 50° C. and revolved for 18 hours. It is believed that the sodium benzyl reacts with the tetramethyl ammonium chloride to form a compound having the formula

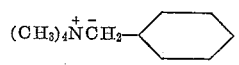

$(CH_3)_4 \overset{+}{N} \overset{-}{C}H_2-$

At this point the titanium-aluminum-chlorine prepara-

| | |
|---|---|
| Heptane | 250 ml. |
| Propylene | 25 grams. |
| Sodium benzyl suspension (1 molar, in mineral oil) | 3.0 ml. (.003 mol). |
| Tetramethyl ammonium chloride suspension (1 molar, in mineral oil) | 1.5–3.0 ml. (.0015–.003 mol). |
| Activated aluminum-titanium-chlorine preparation suspension (produced by reduction of TiCl$_4$ with metallic aluminum followed by intensive grinding; "ARA" produced by Stauffer Chemical Company, 1 molar suspension, in mineral oil) | 2.0–3.0 ml. (.002–.003 mol). |

A series of runs was made in accordance with the foregoing recipe, varying the catalyst ingredients as set forth hereinafter in Table II. In each run a polymerization bottle was charged with the heptane and propylene as described in Example I and the tetramethyl ammonium chloride and sodium benzyl hypodermically injected in the order named. The bottle was then placed upon a polymerizer wheel which dipped and revolved the bottle in a water bath at 50° C. for 18 hours. At this point the bottle was temporarily removed from the wheel and the titanium-aluminum-chlorine preparation suspension injected. The bottle was then further revolved on the polymerizer wheel in the water bath at 50° C. for an additional 48 hours. At the end of this time the bottle was removed from the polymerizer wheel and the polymer therein recovered as described in Example I. During the run, the pressure in the polymerization vessel was determined by means of a hypodermic pressure gauge at the beginning of the run, after the bottle had been on the wheel for 24 hours, and again at the end of the run before the bottle was vented. Set forth herewith in Table II are particulars of the runs.

TABLE II

| Catalyst Ingredient (millimols) | | | Pressure at— | | Yield (grams) | | Run No. |
|---|---|---|---|---|---|---|---|
| TMAC* | Na benzyl | Ti$_3$AlCl$_{12}$ | 24 hrs. (p.s.i.g.) | 48 hrs. (p.s.i.g.) | Isotactic | Atactic | |
| 3.0 | 3.0 | 2.0 | 21 | 3 | 11.7 | 18.6 | 1 |
| 3.0 | 3.0 | 3.0 | 4 | 2 | 9.4 | 17.6 | 2 |
| 1.5 | 3.0 | 2.0 | 13 | 3 | 11.1 | 17.1 | 3 |
| 1.5 | 3.0 | 3.0 | 7 | 3 | 10.4 | 17.1 | 4 |
| 2.0 | 3.0 | 2.0 | 9 | 3 | 12.4 | 18.4 | 5 |
| 2.0 | 3.0 | 3.0 | 5 | 3 | 11.6 | 18.1 | 6 |

*Tetramethyl ammonium chloride.

Example IV.—Preparation of catalyst

| | |
|---|---|
| Heptane | 250 ml. |
| Propylene | 25 grams. |
| Tetramethyl ammonium chloride suspension (1 molar, in mineral oil) | 1.5–3.0 ml. (.0015–.003 mol, per Table III). |
| Sodium benzyl suspension (1 molar, in mineral oil) | 2.0–3.0 ml. (.0015–.003 mol). |
| Ti–Al–Cl preparation (same suspension as in previous examples) | 3.0 ml. (.003 mol). |

A series of runs was made in accordance with the foregoing recipe, varying the ingredients from run to run as indicated in Table III. In each case the heptane was charged into a 28-ounce beverage bottle, which was then flushed with nitrogen and sealed in a neoprene-lined crown cap provided with a perforation for the hypodermic injection of reactants. The tetramethyl ammonium chloride and sodium benzyl suspension were injected hypodermically and the bottle placed upon a polymerizer wheel which dipped and revolved the bottle in a water bath at 50° C. for 18 hours. Thereafter the bottle was removed from the polymerizer wheel, inverted and placed in a cradle on a balance which was first brought to equilibrium and then overweighted with a 25-gram weight. Propylene was injected through a conduit and hypodermic needle until the balance was again in equilibrium, the back pressure at this point being about 40 p.s.i.g. The titanium-aluminum-chlorine preparation suspension was then injected and the bottle replaced on a polymerizer wheel and revolved for an additional 72 hours in the water bath at 50° C. The bottle was removed and the contents worked up as described in Example I. Set forth herewith in Table III are the particulars of the runs.

TABLE III

| Catalyst ingredients (millimols) | | | Pressure in bottle (p.s.i.g.) at— | | Yield (grams) | | Run No. |
|---|---|---|---|---|---|---|---|
| (CH$_3$)$_4$NCl | Na benzyl | Ti$_3$AlCl$_{12}$ | 18 hrs. | 72 hrs. | Isotactic | Atactic | |
| 1.5 | 3.0 | 3.0 | 51 | 48 | 4.1 | 6.9 | 1 |
| 3.0 | 2.0 | 3.0 | 15 | 11 | 11.3 | 13.1 | 2 |
| 2.0 | 3.0 | 3.0 | 51 | 49 | 3.5 | 6.2 | 3 |
| 2.0 | 3.0 | *3.0 | 41 | 33 | 6.4 | 9.8 | 4 |

*Not added until 18 hours after beginning of process.

Example V.—Exploration of mol ratios

A series of runs was made in accordance with the procedure of Example I, but varying the amount of catalyst components charged as set forth hereinbelow in Table IV. Hexamethyl phosphoramide was not included in any recipes. Following are particulars of the runs:

TABLE IV

| Millimols of— | | Mol ratio, A/B | C Millimols of Ti$_3$AlCl$_{12}$ | Mol ratio, A/C | Pressure (p.s.i.g.) at end of reaction | Product (grams) | | Run No. |
|---|---|---|---|---|---|---|---|---|
| A Na benzyl | B (CH$_3$)$_4$NCl | | | | | Isotactic | Atactic | |
| 2.0 | 1.33 | 0.67 | 4.0 | 0.5 | 7 | 12.1 | 15.6 | 1 |
| 2.0 | 2.0 | 1.0 | 4.0 | 0.5 | 2 | 11.8 | 18.1 | 2 |
| 2.0 | 3.0 | 1.5 | 4.0 | 0.5 | 2 | 12.7 | 19.4 | 3 |
| 2.0 | 2.0 | 1.0 | 3.0 | 0.67 | 2 | 11.7 | 17.3 | 4 |
| 2.0 | 3.0 | 1.5 | 3.0 | 0.67 | 1 | 13.3 | 18.8 | 5 |
| 2.0 | 4.0 | 2.0 | 3.0 | 0.67 | 32 | 8.8 | 10.8 | 6 |
| 2.0 | 1.33 | 0.67 | 2.0 | 1.0 | 1 | 12.3 | 16.2 | 7 |
| 2.0 | 2.0 | 1.0 | 2.0 | 1.0 | 2 | 12.4 | 16.9 | 8 |
| 2.0 | 3.0 | 1.5 | 2.0 | 1.0 | 2 | 12.5 | 16.3 | 9 |
| 2.0 | 4.0 | 2.0 | 2.0 | 1.0 | 35 | 8.9 | 9.3 | 10 |
| 2.0 | 4.0 | 2.0 | 1.33 | 1.5 | 19 | 16.0 | 7.7 | 11 |
| 2.0 | 1.33 | 0.67 | 1.0 | 2.0 | 31 | 12.2 | 4.5 | 12 |
| 2.0 | 4.0 | 2.0 | 1.0 | 2.0 | 35 | 11.4 | 9.8 | 13 |

Example VI.—Variation of overall catalyst level

A series of runs was made in accordance with the procedure of Example I, using sodium benzyl in place of the sodium phenyl of that example, and varying the amount of catalyst from run to run as set forth herewith in Table V. Hexamethyl phosphoramide was not used in any of the runs. Following are particulars of the several runs.

TABLE V

| Millimols of— | | Mol ratio, A/B | C Millimols of Ti$_3$AlCl$_{12}$ | Mol ratio, A/C | Pressure (p.s.i.g.) at close of reaction | Product (grams) | | Run No. |
|---|---|---|---|---|---|---|---|---|
| A Na benzyl | B (CH$_3$)$_4$NCl | | | | | Isotactic | Atactic | |
| 2.0 | 1.33 | 0.67 | 4.0 | 0.5 | 7 | 12.1 | 15.6 | 1 |
| 2.0 | 2.0 | 1.0 | 4.0 | 0.5 | 2 | 11.8 | 18.1 | 2 |
| 2.0 | 3.0 | 1.5 | 4.0 | 0.5 | 2 | 12.7 | 19.4 | 3 |
| 2.0 | 2.0 | 1.0 | 3.0 | 0.67 | 2 | 11.7 | 17.3 | 4 |
| 2.0 | 3.0 | 1.5 | 3.0 | 0.67 | 1 | 13.3 | 18.8 | 5 |
| 2.0 | 4.0 | 2.0 | 3.0 | 0.67 | 32 | 8.8 | 10.8 | 6 |
| 2.0 | 1.33 | 0.67 | 2.0 | 1.0 | 1 | 12.3 | 16.2 | 7 |
| 2.0 | 2.0 | 1.0 | 2.0 | 1.0 | 2 | 12.4 | 16.9 | 8 |
| 2.0 | 3.0 | 1.5 | 2.0 | 1.0 | 2 | 12.5 | 16.3 | 9 |
| 2.0 | 4.0 | 2.0 | 2.0 | 1.0 | 35 | 8.9 | 9.3 | 10 |
| 2.0 | 4.0 | 2.0 | 1.33 | 1.5 | 19 | 16.0 | 7.7 | 11 |
| 2.0 | 1.33 | 0.67 | 1.0 | 2.0 | 31 | 12.2 | 4.5 | 12 |
| 2.0 | 4.0 | 2.0 | 1.0 | 2.0 | 35 | 11.4 | 9.8 | 13 |

*Example VII*

| | |
|---|---|
| Heptane | 250 ml. |
| Propylene | 25 grams. |
| Tetramethyl ammonium chloride suspension (1 molar, in mineral oil) | 2–4 ml. (.002–.004 mol, per Table VI). |
| Sodium benzyl suspension (1 molar, in mineral oil) | 2 or 3 ml. (.002–.003 mol, per Table VI). |
| Titanium - aluminum - chlorine preparation suspension (prepared by reduction of titanium tetrachloride by aluminum metal, followed by grinding; "AA," a product of the Stauffer Chemical Company, 1 molar, in mineral oil) | 2 or 3 ml. (.002–.003 mol, per Table VI). |

A series of runs was made in accordance with the foregoing recipe, varying the catalyst ingredients from run to run as set forth in Table VI. In each case the heptane and propylene were charged into a polymerization bottle as in Example I. The tetramethyl ammonium chloride and sodium benzyl suspensions were hypodermically injected and the bottle revolved on a polymerizer wheel in a water bath at 50° C. for 24 hours. The titanium-aluminum-chlorine preparation suspension was then injected and the bottle revolved on the wheel for an additional 64 hours, the pressure in the bottle being taken at 18 and 64 hours of treatment. The bottle was vented and the polymers recovered as described in Example I. Following are particulars of the several runs.

TABLE VI

| Catalyst ingredients (millimols) | | | Pressure in bottle at— | | Yield (grams) | | Run No. |
|---|---|---|---|---|---|---|---|
| (CH$_3$)$_4$NCl | Na benzyl | Ti$_3$AlCl$_{12}$ | 18 hrs. | 64 hrs. | Isotactic | Atactic | |
| 2.0 | 2.0 | 2.0 | 24 | 18 | 8.7 | 10.9 | 1 |
| 2.0 | 2.0 | 3.0 | 2 | ---- | 9.9 | 15.5 | 2 |
| 3.0 | 2.0 | 2.0 | 4 | ---- | 11.8 | 14.2 | 3 |
| 3.0 | 2.0 | 3.0 | 2 | ---- | 11.7 | 15.3 | 4 |
| 4.0 | 2.0 | 2.0 | 2 | ---- | 13.1 | 15.2 | 5 |
| 4.0 | 2.0 | 3.0 | 1 | ---- | 10.9 | 16.8 | 6 |
| 4.0 | 3.0 | 3.0 | 0 | ---- | 11.8 | 15.1 | 7 |

Similarly, both styrene and ethylene are polymerized to highly isotactic crystalline polymers, using the process set forth in Example VII.

The novel catalysts of the instant invention may be analogized to the "Ziegler-type" catalysts recently developed for producing highly crystalline and isotactic polymers of alpha-monoolefins in that they comprise the reaction of two different species of compounds. In the case of the Ziegler catalyst, one of the species is a transition metal compound and the other an organometallic compound. In the instant invention, one species is again a transition metal compound, preferably in a lower valence state, and the other a pentahydrocarbon ammonium compound as described hereinabove. In general, the procedures and materials found useful for deactivating and removing catalyst residues from the Ziegler polymerization products are also useful herein. While the preferred material to deactivate the catalyst is methanol added to the polymerization product prior to contact with air, other materials such as ethanol, isopropanol, butanol, water-alcohol mixtures, etc., may be used. Other procedures for treating the polymer products to improve the purity and clarity thereof, such as treatment with alkali, particularly alcoholic alkali solutions (i.e., sodium methylate) ammonia, sodium hydroxide, etc., acids, steam, chelating agents such as ethanolamine, citric acid, ethylendiamine tetraactetic acid, etc., may be used.

The novel catalysts of the instant invention are generically useful to polymerize materials which contain at least one active ethylenic unsaturation per molecule. In addition to the hydrocarbon polymers shown herein, unsaturated compounds containing polar groups, such as vinyl chloride, vinyl acetate, etc., may also be polymerized as disclosed more in detail supra. Particularly preferred monomers are alpha-olefinic hydrocarbons having no more than ten carbon atoms. These monomers include particularly ethylene, propylene, butene-1, isobutene, pentene-1, 3-methylbutene-1, hexene-1, 3,3-dimethylbutene-1, 4-methylpentene-1, decene-1, etc.

In the case of copolymers, some monomers have a far greater rate of polymerization than others utilizing the catalysts of the instant invention. In such cases, the monomers are advantageously added incrementally to the polymerization reaction as polymerization proceeds so as to maintain the desired ratio of the monomers and the resulting copolymer.

The catalyst may be used in any known manner. Although all of the examples herein employ the catalyst in the solvent in which the catalyst was produced, the catalyst may be first purified, dried, and used in that state. For instance, the pentahydrocarbon ammonium may be interacted with a solid transition metal compound, placed on a suitable support, and used in a fixed bed reactor for a continuous polymerization process. This catalyst may also be employed in the solid state in a fluidized bed process, using the olefin monomer as the supporting fluid.

From the foregoing general discussion and detailed experimental examples, it will be evident that the present invention provides a novel process for the polymerization of ethylenically unsaturated compounds, and particularly olefins, which is operable under mild conditions of pressure and temperature and which makes use of novel and inexpensive catalytic compositions. The macromolecular products obtained are useful resins, rubbers and the like and may be used to produce molding resins, fibers, films, rubber cements, etc.

What is claimed is:

1. Process for producing a catalyst which comprises separately interacting (A) a tetrahydrocarbon ammonium salt and (B) a hydrocarbon alkali metal compound, the hydrocarbon groups in said tetrahydrocarbon ammonium salt and hydrocarbon alkali metal compounds containing up to 30 carbon atoms, and at least one of the hydrocarbon groups in said tetrahydrocarbon ammonium salt and hydrocarbon alkali metal compound being selected from the group consisting of aryl and aralkyl groups, and mixing the resultant reaction product with (C) a compound selected from the class consisting of fluorides, chlorides, bromides, iodides, oxychlorides, acetyl acetonates, alkoxides and acetates of di-, tri- and tetravalent titanium, tetravalent zirconium, pentavalent vanadium, di- and trivalent iron, pentavalent antimony, trivalent bismuth, tetravalent tin, divalent cobalt, trivalent antimony, pentavalent tungsten, chromium, and nickel, and activated aluminum-reduced titanium tetrachloride preparations.

2. Method of polymerizing an ethylenically unsaturated compound comprising contacting the compound with a catalyst produced by separately interacting (A) a tetrahydrocarbon ammonium salt and (B) a hydrocarbon alkali metal compound, the hydrocarbon groups in said tetrahydrocarbon ammonium salt and hydrocarbon alkali metal compounds containing up to 30 carbon atoms, and at least one of the hydrocarbon groups in said tetrahydrocarbon ammonium salt and hydrocarbon alkali metal compound being selected from the group consisting of aryl and aralkyl groups, and mixing the resultant reaction product with (C) a compound selected from the class consisting of fluorides, chlorides, bromides, iodides, oxychlorides, acetyl acetonates, alkoxides and acetates of di-, tri- and tetravalent titanium, tetravalent zirconium, pentavalent vanadium, di- and trivalent iron, pentavalent antimony, trivalent antimony, pentavalent tungsten, chromium, and nickel and activated aluminum-reduced titanium tetrachloride preparations.

3. Method of claim 2 in which (C) is a titanium compound.

4. Method of claim 2 in which (C) is titanium trichloride.

5. Method of claim 2 in which (C) is a cobalt compound.

6. Method of claim 2 in which (C) is a zirconium compound.

7. Method of claim 2 in which the ethylenically unsaturated compound is an alpha-olefin.

8. Method of claim 2 in which the ethylenically unsaturated compound is an alpha-olefinic hydrocarbon having not more than ten carbon atoms.

9. Method of claim 2 in which the ethylenically unsaturated compound is ethylene.

10. Method of claim 2 in which the ethylenically unsaturated compound is propylene.

11. Method of claim 2 in which the ethylenically unsaturated compound is a conjugated diolefin.

12. Method of claim 2 in which the ethylenically unsaturated compound is propylene and (C) is an aluminum-reduced, activated product of titanium tetrachloride.

13. Method of claim 2 in which the ethylenically unsaturated compound is propylene, (A) is benzyl tetramethyl ammonium, and (C) is an aluminum-reduced, activated product of titanium tetrachloride.

14. A catalytic composition produced by separately interacting (A) a tetrahydrocarbon ammonium salt and (B) a hydrocarbon alkali metal compound, the hydrocarbon groups in said tetrahydrocarbon ammonium salt and hydrocarbon alkali metal compounds containing up to 30 carbon atoms, and at least one of the hydrocarbon groups in said tetrahydrocarbon ammonium salt and hydrocarbon alkali metal compound being selected from the group consisting of aryl and aralkyl groups, and mixing the resultant reaction product with (C) a compound selected from the class consisting of fluorides, chlorides, bromides, iodides, oxychlorides, acetyl acetonates, alkoxides and acetates of di-, tri- and tetravalent titanium, tetravalent zirconium, pentavalent vanadium, di- and trivalent iron, pentavalent antimony, trivalent bismuth, tetravalent tin, divalent cobalt, trivalent antimony, pentavalent tungsten, chromium, and nickel, and activated aluminum-reduced titanium tetrachloride preparations.

15. Process according to claim 2 wherein the hydrocarbon alkali metal compound is an alkali metal aryl.

16. A catalyst composition according to claim 14 wherein (B) is a titanium compound.

References Cited by the Examiner

UNITED STATES PATENTS

| | | | |
|---|---|---|---|
| 2,846,427 | 8/58 | Findlay | 260—94.9 |
| 2,912,424 | 11/59 | Cash | 260—94.9 |
| 2,998,416 | 8/61 | Mendel | 260—94.9 |
| 3,032,390 | 5/62 | Caunt | 260—94.9 |
| 3,081,287 | 3/63 | Coover et al. | 260—94.9 |

FOREIGN PATENTS

| | | |
|---|---|---|
| 570,168 | 2/59 | Belgium. |
| 809,717 | 3/59 | Great Britain. |

OTHER REFERENCES

Gilman: "Organic Chemistry," 2nd ed., vol. I (1953), pp. 529–30.

JOSEPH L. SCHOFER, *Primary Examiner.*